Figure 1:
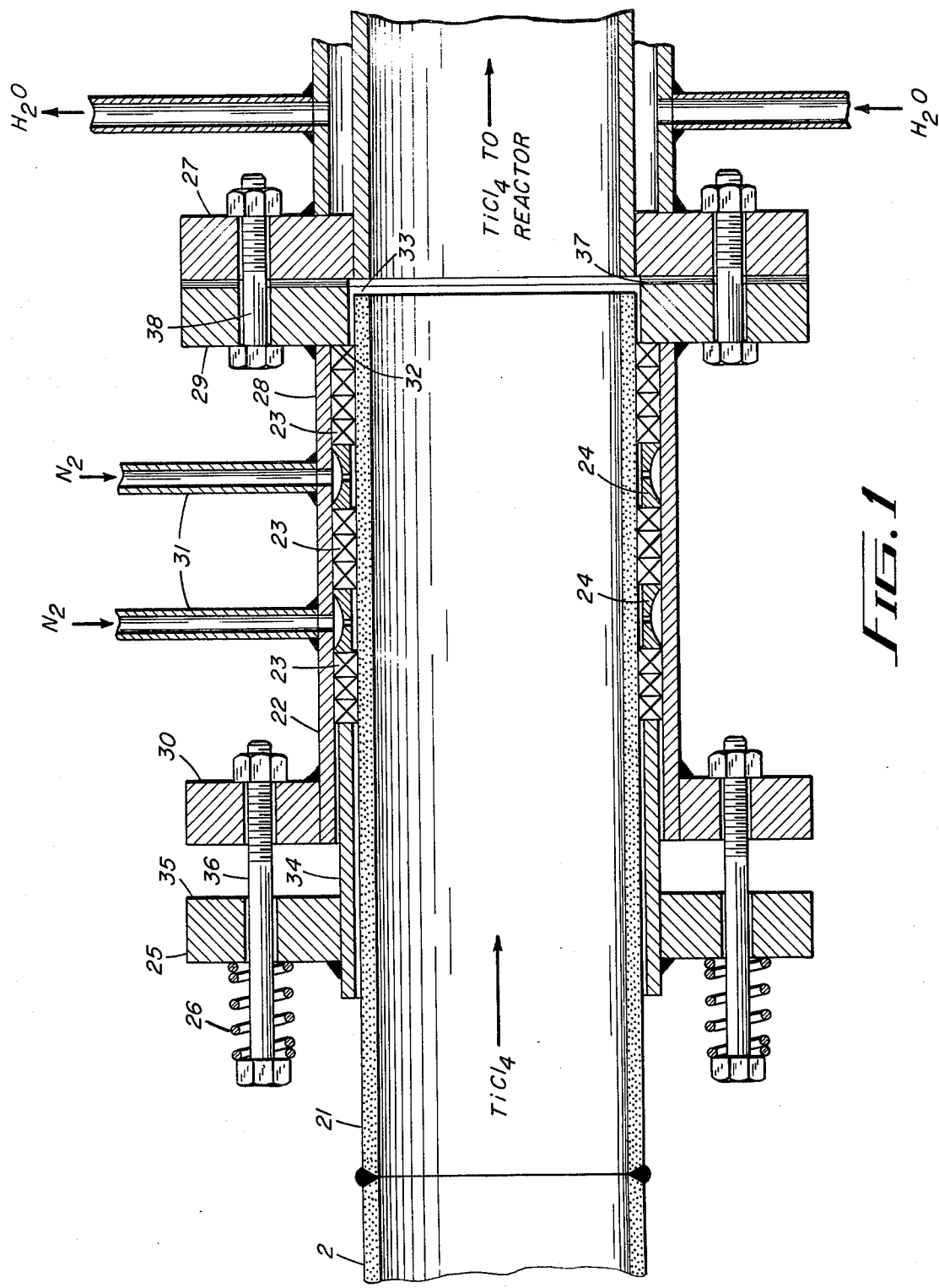

United States Patent [19]
Gingrich, Jr. et al.

[11] 3,984,131
[45] Oct. 5, 1976

[54] PACKING GLAND FOR TICL₄ INLET TO OXIDIZER REACTOR

[75] Inventors: Jacob Christian Gingrich, Jr.; Charles Thomas Bell; Thomas Ralph Hatchell, all of Savannah, Ga.; Benjamin Francis Doty, Suffern, N.Y..

[73] Assignee: American Cyanamid Company, Stamford, Conn.

[22] Filed: Nov. 1, 1974

[21] Appl. No.: 520,090

[52] U.S. Cl. ............................... 285/41; 285/157; 285/175; 285/302; 285/348; 285/363; 285/368; 285/422
[51] Int. Cl.² ........................................ F16L 53/00
[58] Field of Search ............. 285/298, 302, 356, 41, 285/165, 363, 368, 348, 175, 157, 422; 277/1, 68, 98, 106, 130, 201

[56] References Cited
UNITED STATES PATENTS

| | | | |
|---|---|---|---|
| 2,196,766 | 4/1966 | Hasche | 285/41 |
| 2,466,025 | 4/1949 | Hanson | 277/68 X |
| 2,608,424 | 8/1952 | Everett | 277/106 |
| 2,828,980 | 4/1958 | Craig et al. | 285/302 X |
| 3,017,202 | 1/1962 | Swaney | 285/41 |
| 3,081,095 | 3/1963 | Hamrick | 277/1 |
| 3,131,245 | 4/1964 | Lorenz | 285/368 X |

FOREIGN PATENTS OR APPLICATIONS

| | | | |
|---|---|---|---|
| 634,857 | 11/1963 | Belgium | 285/368 |

*Primary Examiner*—Dave W. Arola
*Attorney, Agent, or Firm*—Charles J. Fickey

[57] ABSTRACT

A fabricated packed pipe coupling gland suitable for a connection where there is at least one brittle pipe, the coupling forming a pressure tight, leak proof coupling which is semi-rigid. The coupling is particularly useful for coupling glass pipe to metal pipe for conveying highly corrosive vapors at high temperature, for example heated titanium tetrachloride vapors to a reactor for forming titanium dioxide.

10 Claims, 7 Drawing Figures

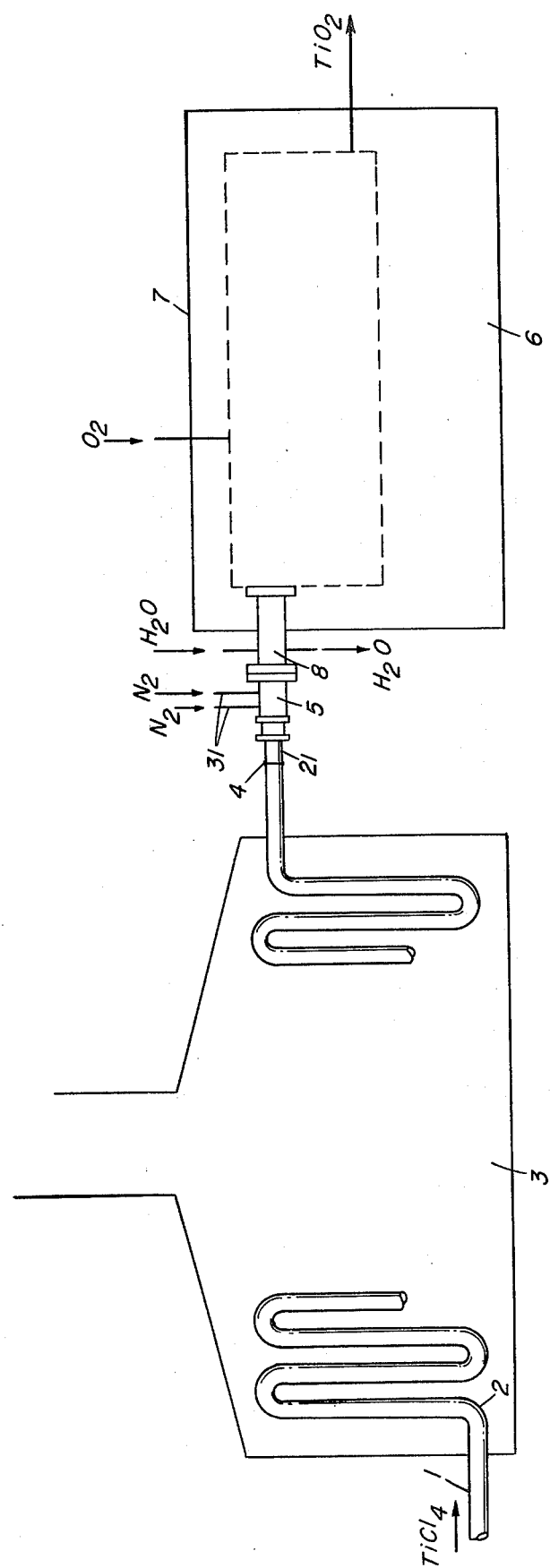

PACKING GLAND FOR TICL₄ INLET TO OXIDIZER REACTOR

The present invention relates to a fabricated pipe coupling for connecting a plain end brittle pipe to a metal pipe or reactor, or to another similar brittle pipe, where the pipes may be subjected to mechanical and high thermal stresses. The invention more particularly relates to such a connection for handling highly corrosive vapors, and more particularly to a coupling between brittle pipes in process lines for forming titanium dioxide by the oxidation of titanium tetrachloride.

For sake of illustration, the present inventive pipe coupling will be described in conjunction with the production of titanium dioxide by the vapor phase oxidation of titanium tetrachloride, although it will be understood that it is not solely confined to this use.

The vapor phase oxidation of titanium tetrachloride to form titanium dioxide is described in U.S. Pat. No. 3,512,219. In that process, titanium tetrachloride vapors are heated to a temperature of about 800° to 1100°C. before reaction with oxygen in a reactor. The titanium tetrachloride vapors are highly corrosive at such elevated temperatures. Thus all surfaces which are contacted by titanium tetrachloride vapors should be sufficiently inert to reaction with the vapors.

Because of the temperature and corrosion factors, heating of the titanium tetrachloride vapors has been done in a furnace having glass (fused silica) pipes. The heated titanium tetrachloride vapors are passed from the glass pipe furnace to a platinum lined metal reactor. Thus the glass pipe must be connected to the inlet of the metallic reactor by a coupling. Previously the connection has been made by using a short section of glass pipe which has a slightly belled end and has been carefully machined on its connecting end to fit against the metal flange of the reactor, and clamped, with sealing gaskets, by means of a flanged collar. This is called a buttress connection. The short pipe was welded to the end of the furnace pipe. In order to form a leakproof seal, the clamping pressure is such that it frequently put such stress on the glass pipe so that it broke. Moreover, it has been difficult to form a good leakproof seal by a gasket in the buttress connection, since any imperfection in the machined end of the glass pipe will not allow the gasket to seal perfectly. Another problem is that the coupling must be replaced fairly often, and the atmosphere in the vicinity of the furnace is so heated as to be relatively exhausting to workmen. Thus there were considerable problems with the buttress connection, since often the connection, once made, would leak and had to be replaced immediately, with great inconvenience and expense due to the process down time.

It is therefore an object of this invention to provide a semi-rigid, leak-proof pipe coupling.

A further object is to provide such a coupling which may be prefabricated and more easily installed.

Another object is to provide a pipe coupling that does not have to be manufactured to close machining tolerances.

A further object is to provide a pipe coupling which will withstand high temperature and highly corrosive vapors.

These and other objects of the invention will become apparent as the description thereof proceeds.

Figure 2:
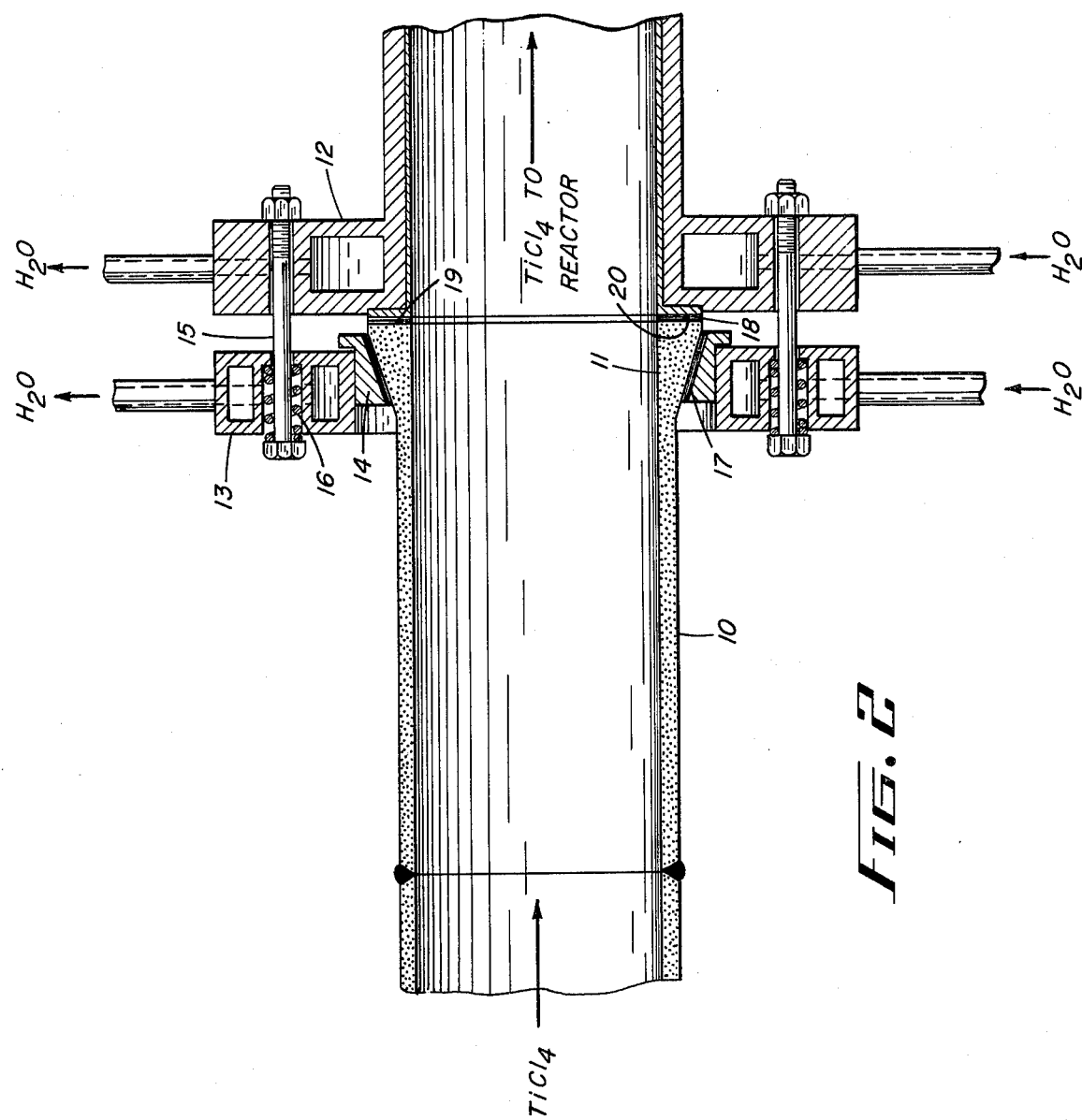
Figure 3:
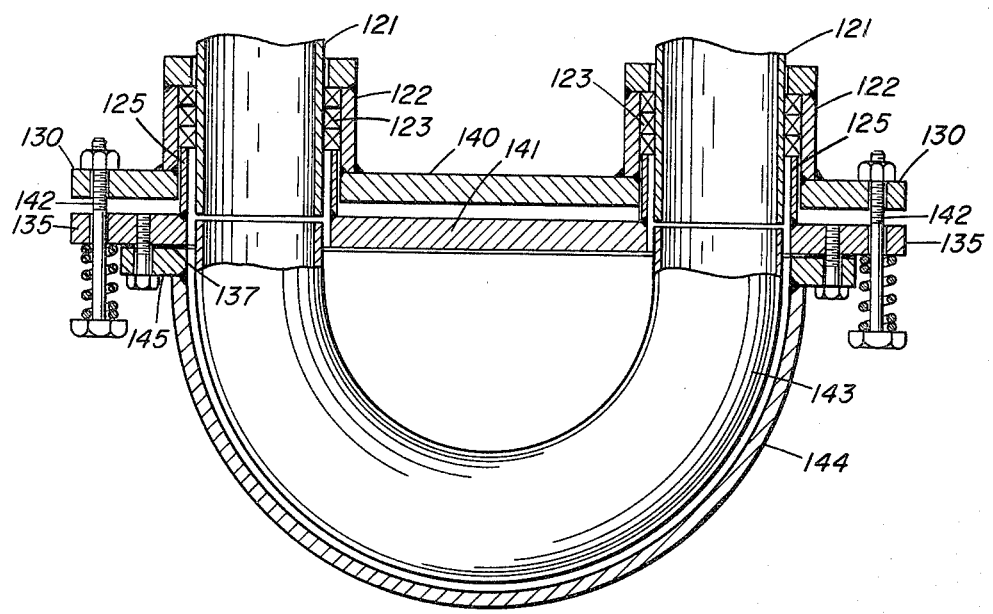
Figure 4:
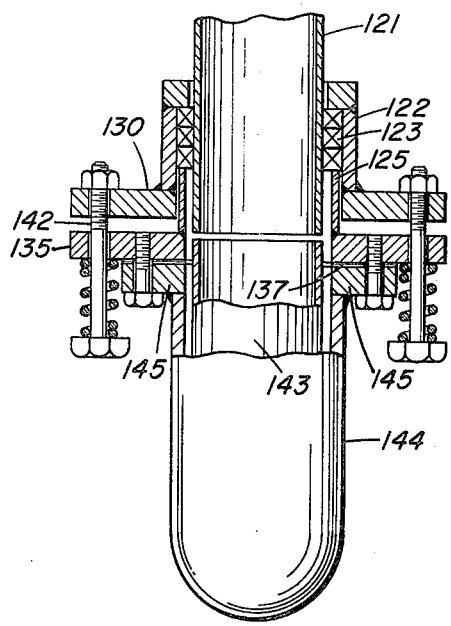
Figure 5:
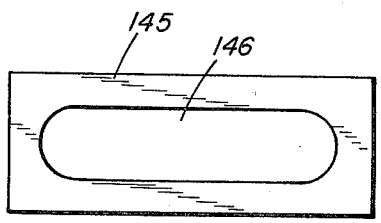
Figure 6:
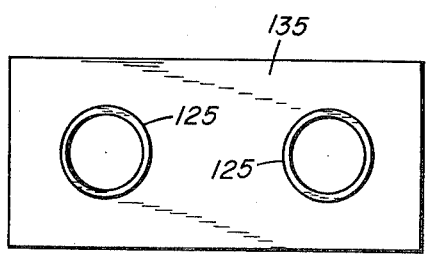

The invention may be more readily understood by reference to the drawings in which FIG. 1 shows a cross-sectional view of the inventive pipe coupling, FIG. 2 shows a cross-sectional view of a pipe coupling according to the prior art, FIG. 3 shows a cross-sectional side view taken along the lines 3—3 of FIG. 4 of a variation of the inventive coupling to connect two brittle pipes in a U-bend, FIG. 4 shows an end view taken along the lines 4—4 of FIG. 3 with parts broken away of the pipe coupling in FIG. 3, FIGS. 5 and 6 are plan views of parts of the pipe coupling of FIG. 3, and FIG. 7 is a schematic view in elevation of the furnace and reactor zones for a vapor phase titanium dioxide process.

Referring to FIG. 7, in the production of titanium dioxide by the vapor phase oxidation of titanium tetrachloride, the titanium tetrachloride vapors are fed into the inlet 1 of glass pipes 2 in furnace 3. Pipes 2 are composed of a series of U-bends of fused silica pipe. The titanium tetrachloride vapors are heated to about 1000°C. and leave the furnace at 4 which is the point where a coupling 5 is made between furnace 3 and reactor zone 6. A section of glass pipe 21 is fusion welded to the furnace pipes 2 at point 4 and is inserted into a metallic coupling 5. Coupling 5 is connected to metallic reactor 7 by means of a water cooled flanged metallic pipe section 8. It will be clear, however, that coupling 5 could be fastened directly to reactor 7. In the process as shown, oxygen is fed to reactor 7, together with the heated titanium tetrachloride vapors, to produce titanium dioxide. A nitrogen purge gas is passed into the coupling 5 at 31 to prevent vapor leakage from the coupling, as will be described in greater detail subsequently. In the arrangement described in FIG. 7, it is possible to prefabricate coupling 5 including the pipe joing 21, and install it by bolting to reactor 7 at the flanged end, and welding pipe 21 at point 4. The coupling is removable by fusion cutting at point 4 and unbolting the flanges.

In FIG. 2, a coupling used by the prior art is shown. A section of silica pipe 10 having a machined buttress 11 was bolted to a water cooled flange 12 by a water cooled backing flange 13 buttress insert ring 14 and bolts 15 with spring washers 16. The coupling included gaskets 17 and 18. This gave rigid connection requiring precise installation procedures and preparation of component parts. Face 19 of buttress 11 and 20 of flange 12 had to be precisely machined. It resulted in a fragile connection subject to frequent breaks due to stresses occurring under various operating conditions and to bolting pressure at the buttress 11. Leaks at the flange face 20 were also common since it was not possible to compress gasket 18 sufficiently tight because the necessary pressure might break buttress 11. In addition, if faces 19 and 20 were not perfectly machined, the gasket 18 would not form a good seal between the faces and leaks occurred.

The problems of the prior art were solved by the use of a packed coupling as shown in FIG. 1.

Briefly, FIG. 1 is a horizontal cross-section of the packed coupling 5. A length of plain end machined silica pipe 21 is inserted into flanged packing gland 22 which consists of high temperature packing 23 and one or more lantern rings 24. An inert gas purge (nitrogen) is used on the lantern rings to prevent hot titanium tetrachloride vapor from leaking backwards through the packing to the atmosphere. The follower 25 has spring loading 26 to apply continuous pressure and compensate for expansion of metal and compression of packing at high temperatures. The unit is bolted to a water cooled flange 27 at the inlet of a water cooled metal reactor 7. (See FIG. 7) Then the machined pipe 21 is fusion welded to a length of unmachined glass pipe 2 at the outlet 4 of a fired heater 3. Flange 27 may be part of a water cooled extension 8 (as shown in FIG. 7) to enable installation in an unheated area adjacent to a fire box 6 in which the reactor is located.

Considering the coupling in greater detail, packing gland 22 consists of a sleeve 28 having a flange 29 at one end and a flange 30 at the other end. In FIG. 1, gland 22 also has two fluid inlet lines 31 for a purge gas. Flange 29 forms an annular abutment 32 for holding compressible packing rings 23. In addition, the internal diameter of flange 29 is slightly larger than the outside diameter of pipe 21, so that there is no contact between them. In assembling the coupling, the section of fused silica pipe 21 is inserted into gland 22 leaving a space 33 at the face of flange 29. Packing rings 23 and metallic lantern rings 24 are then inserted into the annular space between the outside of pipe 21 and the inside of gland 22. The number of packing rings will be such that the lantern rings are spaced opposite the openings of inlet lines 31. The metallic lantern rings 24 have an inside diameter slightly larger than pipe 21, and are annular perforated rings which admit purge gas to the packed annular space between gland 22 and pipe 21. Follower 25 is then placed over pipe 21 and inserted into gland 22 until it contacts packing 23. Follower 25 consists of a sleeve 34 and flange 35, sleeve 34 having an inside diameter slightly larger than the outside diameter of pipe 21. Bolts 36 are inserted into springs 26 and through flange 35 of follower 25 and flange 30 of gland 22. The bolts are then tightened sufficiently to compress packing rings 23 so that pipe 21 is held solely by the pressure of the packing rings and is not in contact with any metal parts of the coupling. It has been found that this may be done with a torque of 120 pounds on the tightened bolts. The packed coupling is less rigid, is more easily installed and can absorb shocks without frequent breaks. The spring loading and nitrogen purge prevent leaks which could cause air pollution and corrosion damage problems. The prefabricated packed coupling can be installed by bolting flange 29 to flange 27 with a gasket 37 between the flange faces by means of bolts 38. Since there is no fragility at this point, bolts 38 may be tightened as much as possible to form a gas tight seal at gasket 37. The installation of the coupling is completed by fusion weld pipe 21 to pipe 2, by known methods. The titanium tetrachloride vapors, which are normally under a pressure of about 5 p.s.i.g., are prevented from escaping through the coupling by the combination of packing rings 24, and the purge gas which is fed into lantern rings 24 at a pressure of about 10 p.s.i.g.

In the titanium dioxide process the metallic follower 25, gland 26 and lantern rings 24 are of high heat and corrosion resistant metal such as a high nickel alloy, having at least 60% nickel, e.g. Nickel 200, Nickel 201, Inconel 600, Inconel 625, and the like, (as made be International Nickel Co.). Lines 31 and bolts 36 and 38 and springs 26 may be stainless steel. The bolts and springs may be ordinary carbon steel, except that they may not be reusable then. Gasket rings 23 are of a heat and corrosion resistant material such as graphite or fiberglass, e.g. Refrasil fiberglass packing (as manufactured by H. I. Thompson Fiberglass Co.). Gasket 37 between flanges 27 and 29 may be of a suitable heat and corrosion resistant material, e.g. asbestos. Modifications designed to provide additional protection of metal against more corrosive substances and/or higher temperature by using cooling jackets or protective linings do not change the basic design of the apparatus. Likewise, the number or type of lantern rings or packing rings as well as the type of purge gas can be varied to provide additional protection of packing and construction material or to meet sealing requirements. For instance, there are some applications in which purge gases other than nitrogen would be more readily available or more compatible with the system. There are some applications at lower temperatures in which the metallic parts and packing could be varied. The unit can be easily modified to couple two sections of brittle pipe together by having a packing gland at both ends of the unit (as when two units are bolted together back to back).

One embodiment of the invention used to connect two brittle pipes together is shown in FIGS. 3 to 6. The coupling is for a U-bend such as those in the silica pipe 2 in furnace 3. Because of the high temperature, the pipe bends are subject to movement resulting in breakage, particularly in the sections of pipe closest to the outlet of furnace 3. By use of a U-bend coupling as shown in FIGS. 3 to 6, pipe 2 is given some flexibility so that breakage is not as likely to occur. The basic principal of the U-bend coupling is essentially similar to that illustrated in FIG. 1. A silica pipe 121 is inserted into a packing gland 122 with packing rings 123. A follower 125 fits into gland 122 against packing 123 and is bolted at flanges 130 and 135. In this embodiment, flange 130 is an elongated plate 140 haaving two packing glands welded thereto. Flange 135 is an elongated plate 141 having two follower sleeves 125 which fit into the two packing glands 125. Flanges 130 and 135 are bolted together at 142. The U-bend silica pipe section 143 is contained in a metallic housing 144 having a flange 145 with elongated opening 146 which is securely bolted to follower flange 135, with a gasket 137 between the flange faces. Pipes 121 are inserted so that they do not make contact with U-bend pipe 143. No purge gas means is shown since it is not necessary at this point. The U-bend coupling allows flexing and temperature compensation in the furnace pipes preventing breaking of the pipes.

While the coupling has been described as useful in the vapor phase oxidation of titanium tetrachloride to produce titanium dioxode, this same basic design is suitable for use with a wide range of materials other than the titanium tetrachloride used here. It can also be adapted for much higher temperature operation by simply fabricating a cooling jacket for gland body and/or follower. This type modification would, also, enable installation in a heated firebox. Protective coatings can be used to handle more corrosive materials. The unit can easily be for use in coupling two sections of brittle pipe. A wide variation of packing materials or alloys is available depending on the specific application. The packing inventive gland coupling provides a superior seal, is much less rigid and is more easily installed than the standard buttress type of connection. Therefore, it is less subject to leaks and breaks due to stresses which occur during startups, shutdowns and system upsets as well as normal operations.

We claim:

1. Pipe coupling means for coupling brittle pipe comprising a outer metallic sleeve means having a flange at each end, means on one of said flanges to form an immovable connection to other conduit means, a plurality of packing rings within said sleeve, at least one metallic lantern ring means interspersed in said packing rings, means to continuously admit a purge gas to said lantern ring under pressure greater than that within said brittle pipe, packing retaining means within said sleeve adjacent one of said flanges, a flanged metallic follower sleeve means fitting within said outer sleeve, said coupling means receiving a brittle pipe of less outer diameter than the inside diameter of any metallic means, means connecting said follower flange to said other sleeve flange means to urge said follower against said packing and said packing against said packing retaining means, said means providing sufficient force to expand said packing thereby holding said brittle pipe in spaced relation from said metallic means.

2. The coupling of claim 1 including at least two lantern rings.

3. The coupling of claim 1 wherein said brittle pipe is a short section and is a part of said coupling. k 4. The coupling of claim 1 wherein said urging means is a plurality of spring loaded bolts through said follower flange and the adjacent sleeve flange.

5. The coupling of claim 1 including a section of flanged, jacketed fluid cooled metallic conduit attached at the sleeve flange of said coupling away from said brittle pipe, a gasket being between said flange faces.

6. The coupling of claim 1 wherein said brittle pipe is a silica pipe.

7. The coupling of claim 1 wherein said packing is thermally and chemically resistent.

8. The coupling of claim 7 wherein said packing is fiberglass.

9. The coupling of claim 1 wherein said sleeve, follower and lantern rings are of a thermally and chemically resistent metal alloy.

10. The coupling of claim 1 wherein said alloy is a high nickel alloy.

* * * * *